United States Patent [19]
Myers, Jr.

[11] Patent Number: 6,088,381
[45] Date of Patent: Jul. 11, 2000

[54] SYSTEM FOR TRANSPORTING FREQUENCY HOPPING SIGNALS

[75] Inventor: Thomas C. Myers, Jr., Columbus, Ga.

[73] Assignee: Ericsson Inc., Research Triangle Park, N.C.

[21] Appl. No.: 08/996,843

[22] Filed: Dec. 23, 1997

[51] Int. Cl.[7] .............................. H04L 27/30; H04J 1/00
[52] U.S. Cl. .......................... 375/132; 370/343; 370/481; 455/20; 455/118
[58] Field of Search ..................... 370/480, 482, 370/344, 319, 320, 343, 481; 375/132–134, 135, 136, 233; 455/22, 118, 20

[56] References Cited

U.S. PATENT DOCUMENTS

| | | | |
|---|---|---|---|
| 4,850,036 | 7/1989 | Smith ........................................ | 375/134 |
| 5,428,602 | 6/1995 | Kemppainen ............................ | 375/133 |
| 5,506,863 | 4/1996 | Meiden et al. ........................... | 375/134 |
| 5,537,434 | 7/1996 | Persson et al. .......................... | 375/134 |

FOREIGN PATENT DOCUMENTS

| | | |
|---|---|---|
| WO 92 09154 | 5/1992 | WIPO . |
| WO 96 23370 | 8/1996 | WIPO . |
| WO 96 27269 | 9/1996 | WIPO . |

*Primary Examiner*—Chi H. Pham
*Assistant Examiner*—Maikhanh Tran
*Attorney, Agent, or Firm*—Robert A. Samra

[57] ABSTRACT

A system for transporting radio frequency (RF) signals across a RF network comprises a central transport unit and a remote transport unit. The frequencies of at least some of the RF signals to be transported hop in accordance with predetermined hopping sequences. The central transport unit uses the hopping sequences to convert the hopping frequencies into fixed frequencies for efficient transport through the RF network. The remote transport unit uses the hopping sequences to convert the fixed frequencies back to the original hopping frequencies. The transport system is also capable of reverse operation in the direction from the remote transport unit to the central transport unit.

20 Claims, 3 Drawing Sheets

|  | BURST 1 | BURST 2 | BURST 3 | BURST 4 | BURST 5 | BURST 6 | ... |
|---|---|---|---|---|---|---|---|
| TRANSCEIVER 1 | $f_1$ | $f_1$ | $f_1$ | $f_1$ | $f_1$ | $f_1$ | |
| TRANSCEIVER 2 | $f_2$ | $f_4$ | $f_3$ | $f_5$ | $f_2$ | $f_4$ | |
| TRANSCEIVER 3 | $f_4$ | $f_3$ | $f_5$ | $f_2$ | $f_4$ | $f_3$ | ... |
| TRANSCEIVER 4 | $f_3$ | $f_5$ | $f_2$ | $f_4$ | $f_3$ | $f_5$ | |
| TRANSCEIVER 5 | $f_5$ | $f_2$ | $f_4$ | $f_3$ | $f_5$ | $f_2$ | |

*FIG. 3*

|  | BURST 1 | BURST 2 | BURST 3 | BURST 4 | BURST 5 | BURST 6 | ... |
|---|---|---|---|---|---|---|---|
| TRANSCEIVER 1 | $f_a$ | $f_a$ | $f_a$ | $f_a$ | $f_a$ | $f_a$ | |
| TRANSCEIVER 2 | $f_b$ | $f_b$ | $f_b$ | $f_b$ | $f_b$ | $f_b$ | |
| TRANSCEIVER 3 | $f_c$ | $f_c$ | $f_c$ | $f_c$ | $f_c$ | $f_c$ | ... |
| TRANSCEIVER 4 | $f_d$ | $f_d$ | $f_d$ | $f_d$ | $f_d$ | $f_d$ | |
| TRANSCEIVER 5 | $f_e$ | $f_e$ | $f_e$ | $f_e$ | $f_e$ | $f_e$ | |

*FIG. 5*

SYSTEM FOR TRANSPORTING FREQUENCY HOPPING SIGNALS

BACKGROUND OF THE INVENTION

1. Technical Field

The present invention relates to radio frequency (RF) transport systems and, more specifically, to a RF transport system capable of efficiently transporting RF signals from one or more RF transceivers which employ frequency hopping.

2. Related Prior Art

Wireless communications services using RF signals became readily accessible to the general public with the advent of cellular radio systems. In a typical cellular radio system a geographical area (e.g., a metropolitan area) is divided into several smaller, contiguous radio coverage areas, called "cells", which are served by a corresponding group of fixed radio stations, called "base stations", each of which includes a plurality of radio frequency (RF) channel units (transceivers) that operate on a subset of the RF channels assigned to the system, as well known in the art. The RF channels allocated to any given cell may be reallocated to a distant cell in accordance with a frequency reuse plan as is also well known in the art. In each cell, at least one RF channel, called the "control" or "paging/access" channel, is used to carry control or supervisory messages. The other RF channels are used to carry voice conversations and thus are called the "voice" or "speech" channels.

The cellular telephone users (mobile subscribers) in the aforementioned system are usually provided with portable (hand-held), transportable (hand-carried) or mobile (car-mounted) telephone units, collectively referred to as "mobile stations", each of which communicates with a nearby base station. Each of the mobile stations includes a microphone, a loudspeaker, a controller (microprocessor) and a transceiver, as well known in the art. The transceiver in each mobile station may tune to any of the RF channels specified in the system (whereas each of the transceivers in the base stations usually operates on only one of the different RF channels used in the corresponding cell).

The base stations in the aforementioned system are connected to and controlled by a mobile telephone switching office (MTSO) which, in turn, is connected to a local central office in the landline (wireline) public switched telephone network (PSTN), or to a similar facility such as an integrated services digital network (ISDN). The MTSO switches calls between wireline and mobile subscribers, controls signalling and assignment of voice channels to the mobile stations, performs "handoffs" of calls from one base station to another, compiles billing statistics, stores subscriber service profiles, and provides for the operation, maintenance and testing of the system.

The original cellular radio system, as described generally above, used analog transmission methods, specifically frequency modulation (FM), and duplex (two-way) RF channels in accordance with the Advanced Mobile Phone Service (AMPS) standard. In the United States, this original AMPS (analog) architecture formed the basis for an industry standard sponsored by the Electronics Industries Association (EIA) and the Telecommunications Industry Association (TIA), and known as EIA/TIA-553. In the middle to late 1980s, however, the cellular industry both in the United States and in other parts of the world began migrating from analog to digital technology, motivated in large part by the need to address the steady growth in the subscriber population and the increasing demand on system capacity. The industry thus developed a number of air interface standards which use digital voice encoding (analog-to-digital conversion and voice compression) and advanced digital radio techniques, such as time division multiple access (TDMA) or code division multiple access (CDMA), to multiply the number of voice circuits (conversations) per RF channel (i.e., to increase capacity).

In Europe and Japan, the GSM and PDC standards, respectively, both of which use TDMA, have been widely implemented. In the United States, the EIA/TIA has developed a number of digital standards, including IS-54 (TDMA) and IS-95 (CDMA), both of which are "dual mode" standards in that they support the use of the original AMPS analog voice channels (AVCHs) and analog control channel (ACCH), in addition to newer digital traffic channels (DTCHs) defined within the existing AMPS framework, so as to ease the transition from analog to digital and to allow the continued use of existing analog mobile stations. The dual-mode IS-54 standard, in particular, has become known as the digital AMPS (D-AMPS) standard. More recently, the EIA/TIA has developed a new specification for D-AMPS, which includes a digital control channel (DCCH) suitable for supporting various data services, sometimes referred to as "personal communications services" (PCS), and extended mobile station battery life. This new specification, which builds on the IS-54B standard (the current revision of IS-54), is known as IS-136.

Along with the emergence of digital cellular and PCS, there has been a trend towards the integration of telephone and data services with television (TV), computer and/or multimedia networks. FIG. 1 shows a typical RF transport system (inside dashed box) which interconnects a cellular or PCS radio base station (RBS) 10 with a mobile station (MS) 20. The RF transport system comprises a central transport unit 12, a RF transport network 14 and a remote transport unit 16. The central transport unit 12 receives a RF signal on a first frequency $f_x$ from the RBS 10 and converts that signal into a signal at a second frequency $f_y$ suitable for transmission over the RF transport network 14. Depending on the application, the RF transport network 14 may comprise, for example, a local area network (LAN), a wide area network (WAN), the global communications network known as the Internet, a wired or "wireless" cable TV network, a video network, a fiberoptic network or a point-to-point microwave network. The signal that is carried through the RF transport network 14 at frequency $f_y$ is finally provided to the remote transport unit 16 which converts this signal into a signal at a third frequency $f_z$ for transmission through an antenna 18 to the MS 20.

The use of RF transport systems as generally depicted in FIG. 1 is complicated in practice by the use of frequency "hopping" at the base station. Some cellular or PCS systems, such as those which implement the GSM standard, vary (hop) the frequency of the signal transmitted from the base station to the mobile station over time in order to reduce the deteriorative effects of Rayleigh fading (the phenomena wherein the received signal strength will vary due to multipath propagation of the transmitted signal). By rapidly changing the frequency of the transmitted signal from the base station, the fading locations will vary over the course of a call, thus decreasing the average depth and duration of fading dips at the mobile station. Of course, the receiver in the mobile station must hop along with the transmitter in order to correctly receive the signal. For this purpose, synchronization information regarding the relevant hopping sequence is usually transmitted from the base station to the mobile station over a broadcast or dedicated control channel.

FIG. 2 illustrates the use of frequency hopping at the RBS 10 shown in FIG. 1. The RBS 10 includes a plurality of transceivers 11 such as transceivers 1 . . . 5. One of the transceivers (e.g., transceiver 1) in the RBS 10 is used for control channel signalling and is assigned a fixed frequency $f_1$. Each of the other transceivers (e.g., transceivers 2 . . . 5) in the RBS 10, on the other hand, hops within a predefined set of frequencies such as $f_2-f_5$ using a unique hopping sequence that defines the order of the frequencies at its output over time. For example, in a TDMA system wherein the hopping sequence repeats every four bursts, the outputs of the frequency hopping transceivers (transceivers 2 . . . 5) may be as shown in FIG. 3.

When transmitting the various outputs of the frequency hopping transceivers (transceivers 2 . . . 5) through the RF transport network 14, it is desirable that the various output frequency signals be "packed" together so as to make efficient use of the available bandwidth in the network 14, and that these packed signals be translated into signals in some predefined area of the spectrum such that they can coexist with other RF signals (e.g., cable TV or satellite signals) that are being simultaneously transmitted over the network 14. Upon exiting the RF transport system, these packed and translated signals may be "unpacked" and translated back to their original frequencies for transmission through the antenna 18 to the MS 20. Current implementations of RF transport systems, however, do not allow for such desired packing of the hopping frequencies. Rather, these systems use so-called "block conversion" in which a block of hopping frequencies from a transceiver is converted into an equal block of frequencies in a different part of the spectrum that is suitable for transmission over the network 14, without any packing of frequencies. This approach clearly wastes valuable bandwidth in the transport network.

SUMMARY OF THE INVENTION

The present invention seeks to overcome the shortcomings of existing RF transport systems by recognizing that if the hopping sequences used by transceivers 2 . . . 5 in the base station 10 (which is external to the RF transport system) are made known to the RF transport system, it will be able to pack the hopping frequencies at the central transport unit and to unpack them at the remote transport unit in a manner which would achieve the desired bandwidth efficiency gains.

In one aspect, the present invention provides a radio frequency (RF) transport system, including a central transport unit and a remote transport unit, for efficiently transporting through a transport network a plurality of RF signals transmitted from a central station (e.g., radio base station) to at least one remote station (e.g., mobile station). The frequency of each of the RF signals may hop in accordance with a predetermined hopping sequence that is also transmitted from the central station to the remote station (e.g., over a control channel from the base station to the mobile station). The central transport unit of the present invention comprises means for receiving the frequency hopping signals and the hopping sequences from the central station; means responsive to the hopping sequences for respectively converting the central station frequency hopping signals into respective central unit fixed frequency signals; and means for transmitting the central unit fixed frequency signals and the hopping sequences through the transport network. The remote transport unit of the present invention comprises means for receiving the central unit fixed frequency signals and the hopping sequences from the central transport unit; means responsive to the hopping sequences for respectively converting the central unit fixed frequency signals into respective remote unit frequency hopping signals corresponding to the central station frequency hopping signals; and means for transmitting the remote unit frequency hopping signals and the hopping sequences from the remote transport unit to the remote station.

The RF transport system of the present invention is also capable of efficiently transporting RF signals from the remote station to the central station. Accordingly, the remote transport unit may further comprise means for receiving frequency hopping signals from the remote station; means responsive to the hopping sequences for respectively converting the remote station frequency hopping signals into respective remote unit fixed frequency signals; and means for transmitting the remote unit fixed frequency signals to the central transport unit through the transport network. Similarly, the central transport unit may further comprise means for receiving the remote unit fixed frequency signals from the remote transport unit; means responsive to the hopping sequences for respectively converting the remote unit fixed frequency signals into respective central unit frequency hopping signals corresponding to the remote station frequency hopping signals; and means for transmitting the central unit frequency hopping signals from the central transport unit to the central station.

These and other aspects of the present invention will become readily apparent from the detailed description taken in conjunction with the drawings, as set forth below.

BRIEF DESCRIPTION OF THE DRAWINGS

The present invention will be better understood and its numerous objects and advantages will become apparent to those skilled in the art by reference to the following drawings in which:

FIG. 3 shows an exemplary frequency hopping sequence at the output of each of the frequency hopping transceivers in the base station of FIG. 2;

FIG. 5 shows an exemplary mapping of the output of each of the frequency hopping transceivers in the base station of FIG. 2 to a desired fixed frequency in the RF transport system of FIG. 4.

DETAILED DESCRIPTION OF THE INVENTION

Figure 1:
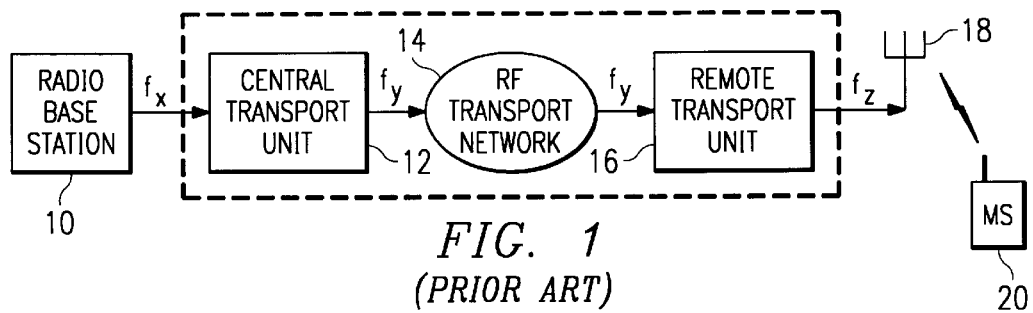
FIG. 1 is a block diagram of an exemplary radio frequency (RF) transport system which interconnects a radio base station to a mobile station.
Figure 2:
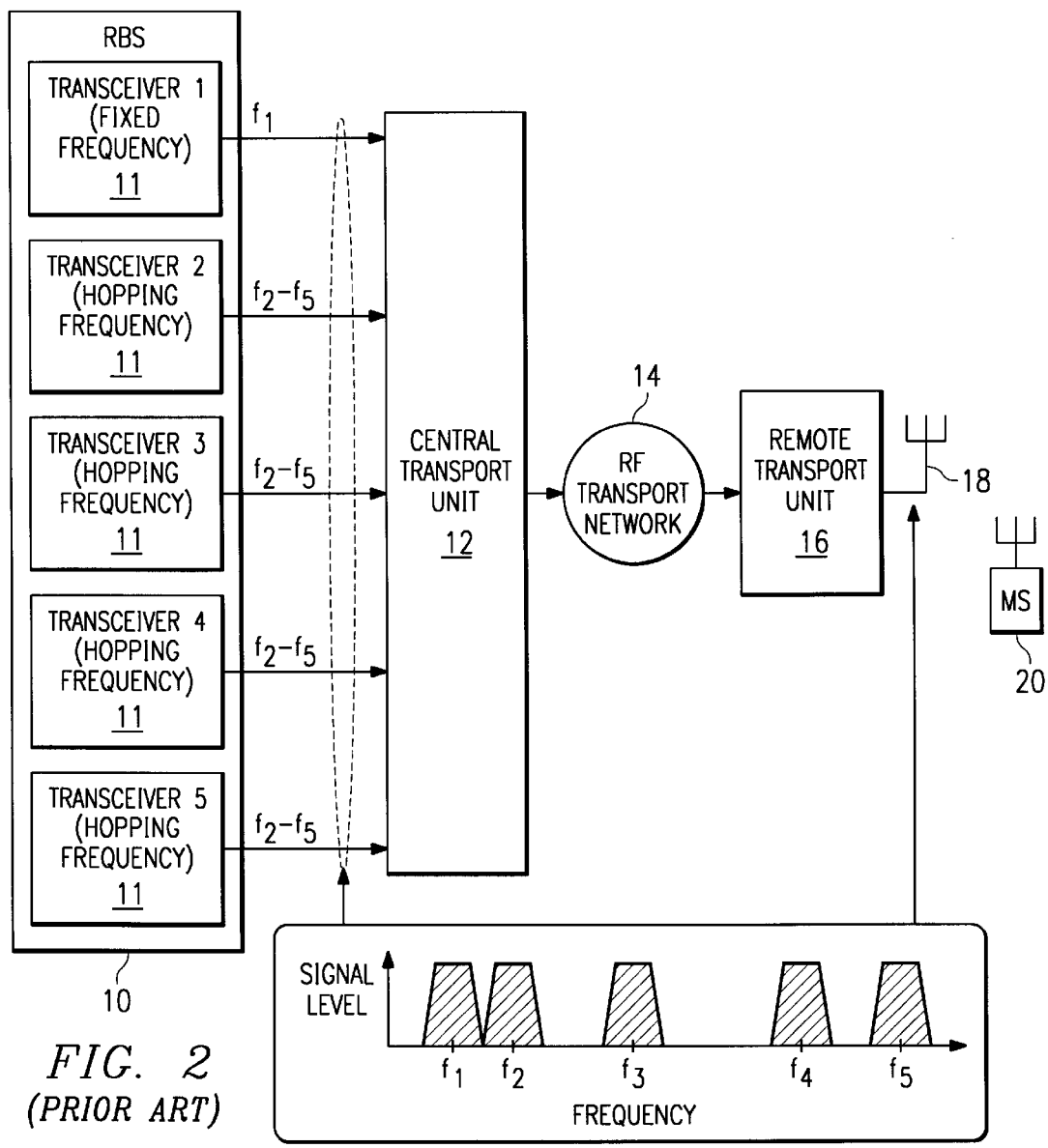
FIG. 2 is an illustration of the RF transport system of FIG. 1 in which frequency "hopping" is used by a number of transceivers in the base station.
Figure 4:
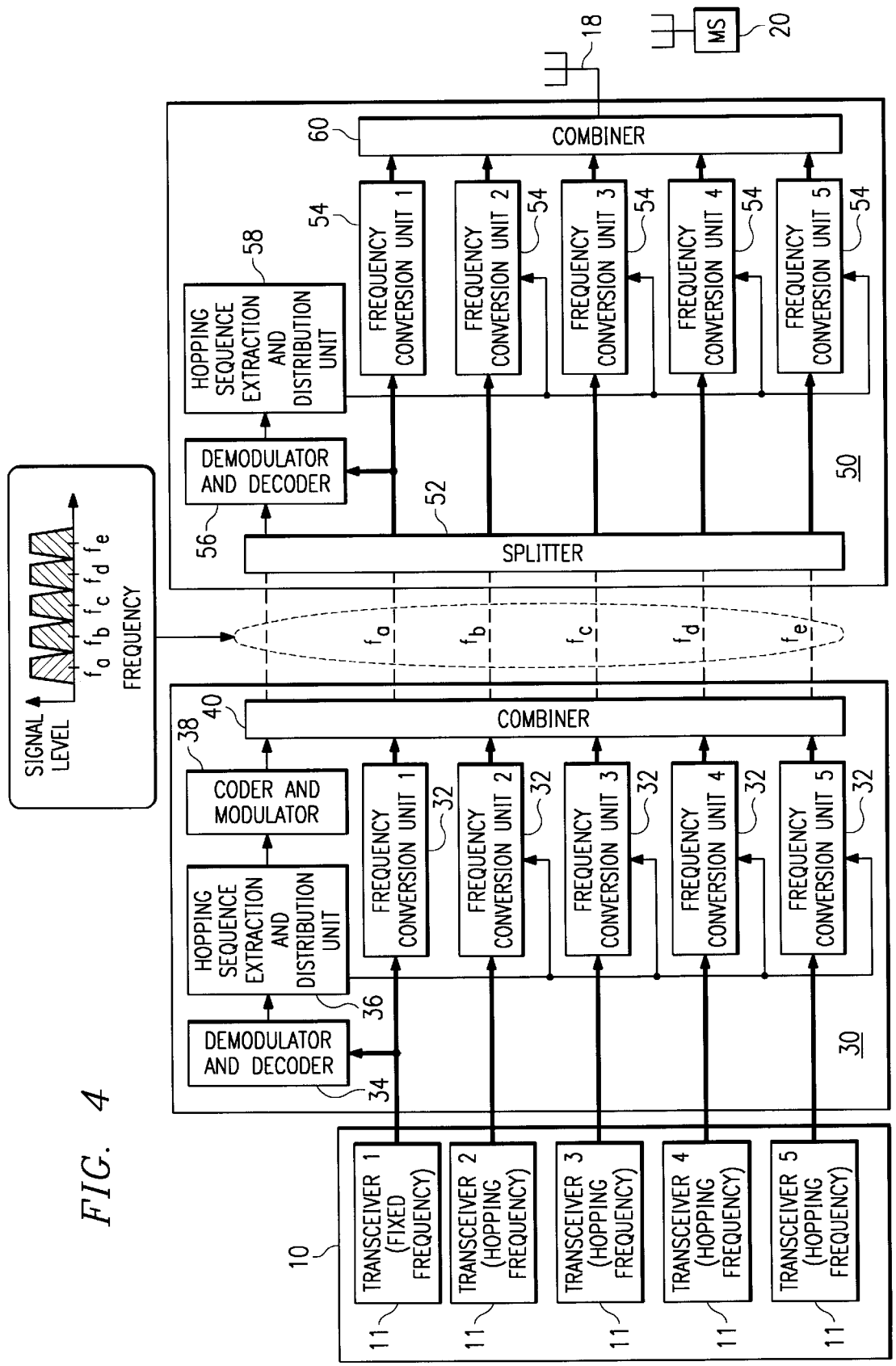
FIG. 4 shows the base station of FIG. 2 interconnected to a RF transport system constructed in accordance with the present invention.

Referring now to FIG. 4, a RF transport system constructed in accordance with the present invention comprises a central transport unit 30 which communicates with the RBS 10, and a remote transport unit 50 which communicates with the MS 20. The central transport unit 30 includes a plurality of frequency conversion units 32 (units 1 . . . 5) for converting the respective outputs of the transceivers 11 (transceivers 1 . . . 5) into frequencies that are compatible with the transport network. In accordance with the present invention, the frequency conversion units 32 are able to convert both the fixed and hopping frequency signals from the transceivers 11 into constant frequency signals that may be efficiently packed together for transportation through the network. For this purpose, the system of the present invention detects the hopping sequences used by the frequency hopping transceivers 2 . . . 5 and provides those sequences to the corresponding frequency conversion units 2 . . . 5, which are then able to perform the necessary conversion from hopping frequencies to fixed frequencies.

As mentioned previously, information regarding the hopping sequences used by the transceivers 2 . . . 5, respectively, is transmitted over the control channel that is supported by transceiver 1 in the RBS 10. As shown in FIG. 4, the central transport unit 30 of the present invention includes a demodulator and decoder combination 34 for demodulating and decoding the control channel signal from transceiver 1, and a hopping sequence extraction and distribution unit 36 for extracting the information regarding the hopping sequence used by each of the transceivers 2 . . . 5 and for distributing that information to the appropriate one of the frequency conversion units 2 . . . 5. As shown in FIGS. 45, frequency conversion units 32 convert the outputs of the transceivers 11 into constant frequencies $f_a$ . . . $f_e$, respectively, that are "packed" (i.e., adjacent to each other) within the spectrum used by the transport network.

As will be appreciated by persons of ordinary skill in the art, each of the frequency conversion units 32 may be comprised of a programmable frequency synthesizer for generating a reference signal, and a mixer for combining the reference signal with the input frequency hopping signal to generate the desired fixed frequency signal. During operation, the frequency of the reference signal in each of the frequency conversion units 2 . . . 5 may be dynamically programmed based on the corresponding hopping sequence information such that the output signal remains at a constant frequency. For example, referring to FIGS. 3–5, during burst 1, the frequency at the output of transceiver 2 is $f_2$ and the frequency of the reference signal in frequency conversion unit 2 may be set to ($f_b$–$f_2$). The mixer will then generate the desired output frequency at $f_b$. Similarly, during burst 2, the frequency at the output of transceiver 2 is $f_4$ and the frequency of the reference signal in frequency conversion unit 2 may be set to ($f_b$–$f_4$) so as to again generate the desired output frequency $f_b$. It will be noted that the reference signal in frequency conversion unit 1 can be set to ($f_a$–$f_1$) for all bursts since the frequency at the output of transceiver 1 is fixed at $f_1$.

As the remote transport unit 50 must be able to "unpack" and reconvert the outputs of the frequency conversion units 32 to their original form for transmission to the MS 20 (and like mobile stations), the hopping sequence information is provided to a coder and modulator combination 38 and combined with the outputs of the frequency conversion units 32 in a combiner 40 for transmission through the transport network to the remote transport unit 50. In the remote transport unit 50 the received signals are first separated in a splitter 52 and the fixed frequency signals are fed to a plurality of frequency conversion units 54 (units 1 . . . 5) that are structurally similar to the frequency conversion units 32. The received hopping sequence information is processed through a demodulator and decoder 56 and then fed to a hopping sequence distribution and extraction unit 58 which distributes the information to the appropriate frequency conversion units 2 . . . 5. Once the received signals have been reconverted to their original frequencies in the frequency conversion units 54, they are combined in a combiner 60 and transmitted through the antenna 18 to the MS 20 (and like mobile stations).

It will be noted that the operation of the present invention in the reverse direction from the MS 20 to the BS 10 is essentially a mirror image of the operation in the forward direction as described above. In other words, the remote transport unit 50 will use the hopping sequence information received from the central transport unit 30 to convert the hopping frequency signal from the MS 20 (and like mobile stations) into a fixed frequency signal which is transmitted to the central transport unit 30 to be reconverted back to its original hopping frequency (based on the same hopping sequence information) before transmission to the BS 10. Thus, the transport system of the present invention is transparent to both the BS 10 and the MS 20 which continue to transmit and receive frequency hopping signals as usual.

While certain forms or embodiments of the present invention have been illustrated and described above, those skilled in the art will readily recognize that many modifications and variations may be made to, or substituted in, those forms or embodiments without substantially departing from the spirit and scope of the present invention. Accordingly, the forms or embodiments of the present invention disclosed herein are exemplary and are not intended as a limitation on the scope of the present invention as defined in the following claims.

What is claimed is:

1. A radio frequency (RF) transport system for transporting through a transport network a plurality of RF signals transmitted from a central station to at least one remote station, the frequency of each of said RF signals hopping in accordance with a predetermined hopping sequence that is also transmitted from said central station to said remote station, the transport system comprising:
    a central transport unit including:
        means for receiving said frequency hopping signals and said hopping sequences from said central station;
        means responsive to said hopping sequences for respectively converting said central station frequency hopping signals into respective central unit fixed frequency signals; and
        means for transmitting said central unit fixed frequency signals and said hopping sequences through said transport network; and
    a remote transport unit including:
        means for receiving said central unit fixed frequency signals and said hopping sequences from said central transport unit;
        means responsive to said hopping sequences for respectively converting said central unit fixed frequency signals into respective remote unit frequency hopping signals corresponding to said central station frequency hopping signals; and
        means for transmitting said remote unit frequency hopping signals and said hopping sequences from said remote transport unit to said at least one remote station.

2. The system of claim 1 wherein said network comprises the Internet.

3. The system of claim 1 wherein said network comprises a local area network (LAN).

4. The system of claim 1 wherein said network comprises a wide area network (WAN).

5. The system of claim 1 wherein said network comprises a wired or wireless cable TV network.

6. The system of claim 1 wherein said network comprises a video network.

7. The system of claim 1 wherein said network comprises a fiberoptic network.

8. The system of claim 1 wherein said network comprises a point-to-point microwave network.

9. The system of claim 1 wherein:

said remote transport unit further includes:
- means for receiving frequency hopping signals from said at least one remote station;
- means responsive to said hopping sequences for respectively converting said remote station frequency hopping signals into respective remote unit fixed frequency signals; and
- means for transmitting said remote unit fixed frequency signals to said central transport unit through said transport network; and said central transport unit further includes:
- means for receiving said remote unit fixed frequency signals from said remote transport unit;
- means responsive to said hopping sequences for respectively converting said remote unit fixed frequency signals into respective central unit frequency hopping signals corresponding to said remote station frequency hopping signals; and
- means for transmitting said central unit frequency hopping signals from said central transport unit to said central station.

10. The system of claim 9 wherein said central station comprises a radio base station, said remote station comprises a mobile station, and said hopping sequences are transmitted from said base station to said mobile station over a control channel.

11. A method for transporting a plurality of radio frequency (RF) signals from a central station to a remote station through a transport network, the frequency of each of said RF signals hopping in accordance with a predetermined hopping sequence sent from said central station to said remote station, the method comprising the steps of:
- providing said frequency hopping signals and said hopping sequences from said central station to a central transport unit;
- converting said central station frequency hopping signals into respective fixed frequency signals in said central transport unit using said respective hopping sequences;
- transmitting said central unit fixed frequency signals and said hopping sequences through said transport network to a remote transport unit;
- receiving said central unit fixed frequency signals and said hopping sequences at said remote transport unit;
- converting in said remote transport unit using said hopping sequences said central unit fixed frequency signals into respective remote unit frequency hopping signals corresponding to said central station frequency hopping signals; and
- transmitting said remote unit frequency hopping signals and said hopping sequences from said remote transport unit to said remote station.

12. The method of claim 11 wherein said network comprises the Internet.

13. The method of claim 11 wherein said network comprises a local area network (LAN).

14. The method of claim 11 wherein said network comprises a wide area network (WAN).

15. The method of claim 11 wherein said network comprises a wired or wireless cable TV network.

16. The method of claim 11 wherein said network comprises a video network.

17. The method of claim 11 wherein said network comprises a fiberoptic network.

18. The method of claim 11 wherein said network comprises a point-to-point microwave network.

19. The method of claim 11 further including the steps of:
- providing frequency hopping signals from said remote station to said remote transport unit;
- converting said remote station frequency hopping signals into respective remote unit fixed frequency signals in said remote transport unit using said hopping sequences;
- transmitting said remote unit fixed frequency signals to said central transport unit through said transport network;
- receiving said remote unit fixed frequency signals at said central transport unit;
- converting in said central unit using said hopping sequences said remote unit fixed frequency signals into respective central unit frequency hopping signals corresponding to said remote station frequency hopping signals; and
- transmitting said central unit frequency hopping signals from said central transport unit to said central station.

20. The method of claim 19 wherein said central station comprises a radio base station, said remote station comprises a mobile station, and said hopping sequences are transmitted from said base station to said mobile station over a control channel.

* * * * *